US011968758B2

(12) United States Patent
Peng

(10) Patent No.: US 11,968,758 B2
(45) **Date of Patent: *Apr. 23, 2024**

(54) LED LIGHT STRING CONTROL SYSTEM AND METHOD OF CONTROLLING THE SAME

(71) Applicant: SEMISILICON TECHNOLOGY CORP., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 105 days.

This patent is subject to a terminal disclaimer.

(21) Appl. No.: 17/827,551

(22) Filed: May 27, 2022

(65) Prior Publication Data

US 2023/0389157 A1 Nov. 30, 2023

(51) Int. Cl.
*H05B 45/44* (2020.01)
*H05B 45/32* (2020.01)

(52) U.S. Cl.
CPC ............. *H05B 45/44* (2020.01); *H05B 45/32* (2020.01)

(58) Field of Classification Search
None
See application file for complete search history.

(56) References Cited

U.S. PATENT DOCUMENTS 11,277,895 B1 * 3/2022 Salam ................ H05B 45/3725
11,672,061 B1 * 6/2023 Peng .................... H05B 45/325 315/185 R

* cited by examiner

*Primary Examiner* — Renan Luque
(74) *Attorney, Agent, or Firm* — Muncy, Geissler Olds & Lowe, P.C.

(57) ABSTRACT

An LED light string control system includes an LED light string, a voltage generation apparatus, and a control module. The control module controls the voltage generation apparatus to change a signal provided to the LED light string to a first voltage level according to a first logic of a light command, and changes the signal to a second voltage level according to a second logic of the light command. The control module controls the voltage generation apparatus to change the signal to a distinction voltage level once the first logics and/or the second logics of the light command appear consecutively.

16 Claims, 10 Drawing Sheets

LED LIGHT STRING CONTROL SYSTEM AND METHOD OF CONTROLLING THE SAME

BACKGROUND

Technical Field

The present disclosure relates to an LED light string control system and a method of controlling the same, and more particularly to an LED light string control system with signal identification function and a method of controlling the same.

Description of Related Art

The statements in this section merely provide background information related to the present disclosure and do not necessarily constitute prior art.

Since the application of light-emitting diodes (LEDs) is becoming more and more popular, and the manufacturing cost thereof is also getting lower and lower, the application of LEDs in lighting or display is becoming more and more extensive. Correspondingly, there are more and more operation and control methods for the lighting behavior of LEDs. In the application of LED light strings, since the previous technology only uses the time width to determine whether the logic signal is "0" or "1", the disadvantage is that in the LED light string, the number of lights, the length of the distance between the lights, and the thickness of the wire diameter of the light string will affect the parasitic capacitive reactance in the LED light string. If the parasitic capacitance is too large, the square wave waveform of "0" and "1" will be distorted.

It is assumed that the square-wave waveform of "0" and "1" should last for 1 μs under ideal conditions, and the LED light string needs to last at least 0.8 μs to identify this signal as "0" or "1". However, due to the distortion by influence of too large parasitic capacitance, the square-wave waveform with logic "0" is only 0.5 μs. Therefore, if the square-wave waveform is distorted, only using the time width to determine the logic signal may easily lead to insufficient time width and misjudgment, which in turn leads to the situation that the LED light string cannot be controlled.

SUMMARY

An object of the present disclosure is to provide an LED light string control system with signal identification function to solve problems of the existing technology. The LED light string control system includes an LED light string, a voltage generation apparatus, and a control module. The LED light string includes at least one LED module. The voltage generation apparatus is coupled to the LED light string. The control module is coupled to the voltage generation apparatus, and controls the voltage generation apparatus to change a signal provided to the LED light string to a first voltage level according to a first logic of a light command, and changes the signal to a second voltage level according to a second logic of the light command. The light command is composed of the plurality of first logics and the plurality of second logics. The control module controls the voltage generation apparatus to change the signal to a third voltage level as a distinction voltage level to distinguish the two consecutive first voltage levels and/or the two consecutive second voltage levels once the first logics and/or the second logics of the light command appear consecutively. The at least one LED module correspondingly generates a drive command according to the plurality of first voltage levels and the plurality of second voltage levels except the distinction voltage level so as to generate lighting behavior according to the drive command.

Another object of the present disclosure is to provide a method of controlling an LED light string control system with signal identification function to solve problems of the existing technology. The method includes steps of: changing a signal received by an LED light string to a first voltage level according to a first logic of a light command, changing the signal to a second voltage level according to a second logic of the light command, changing the signal to a third voltage level as a distinction voltage level for distinguishing the two consecutive first voltage levels and/or the two consecutive second voltage levels when first logics and/or second logics of the light command appear consecutively, and correspondingly generating a drive command, by at least one LED module of the LED light string, according to the plurality of first voltage levels and the plurality of second voltage levels except the distinction voltage level so as to generate lighting behavior according to the drive command. The light command is composed of the plurality of first logics and the plurality of second logics.

The main purpose and effect of the present disclosure are: since the LED light string control system determines the logic signal of "0" or "1" according to the signal level, instead of only determining the logic signal according to the time width, it is not necessary to wait for the full/complete time width of a specific logic before determining that the logic of "0" or "1", and it will not cause the logic to be unidentifiable due to waveform distortion, which can significantly reduce the transmission time and determination time of the light command.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
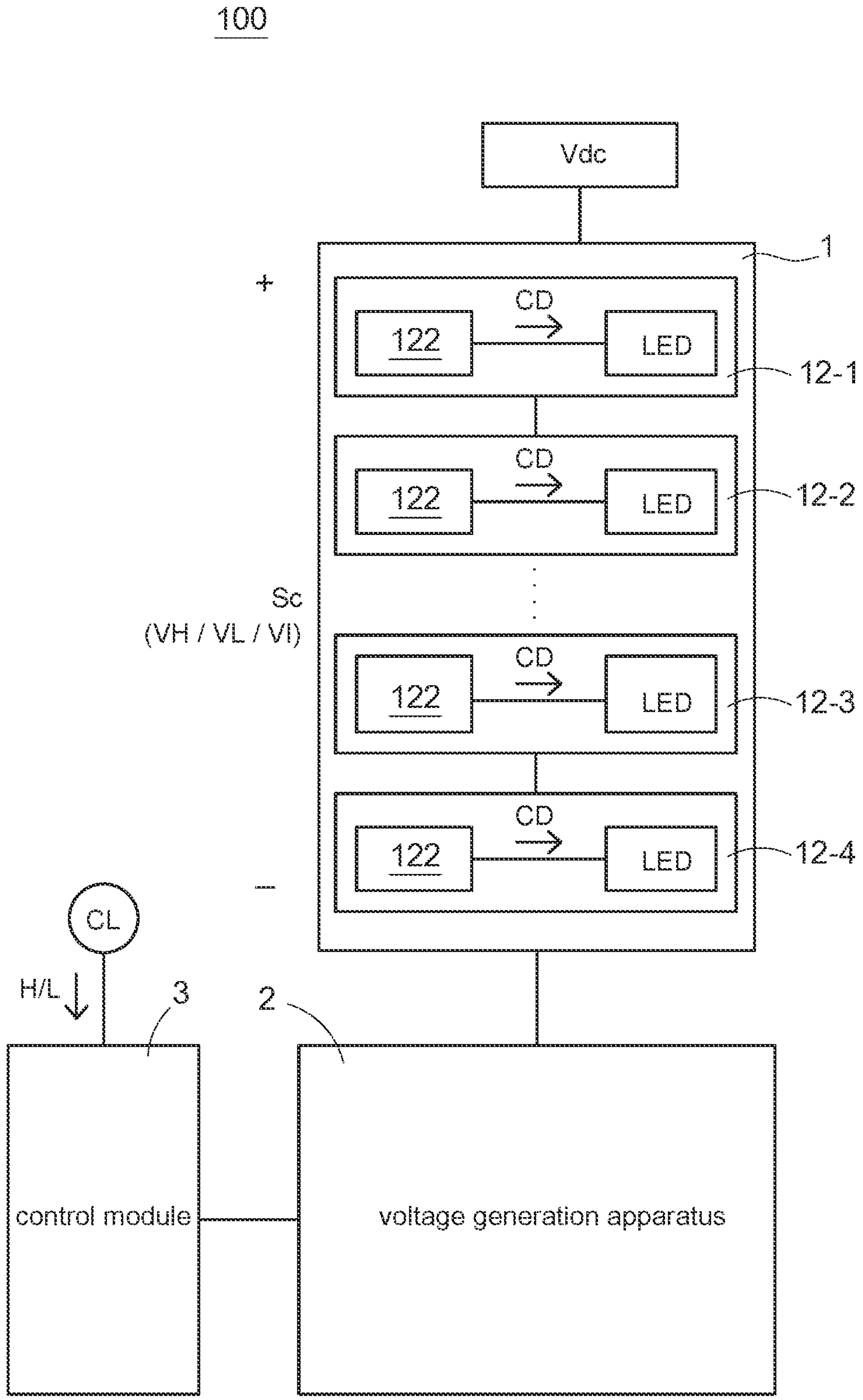
FIG. 1 is a block circuit diagram of an LED light string control system with signal identification function according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of an LED light string control system with signal identification function according to the present disclosure. The LED (light-emitting diode) light string control system 100 receives a DC (direct-current) voltage Vdc. The LED light string control system 100 includes a LED light string 1, a voltage generation apparatus 2, and a control module 3. The LED light string 1 receives the DC voltage Vdc, and the LED light string 1 includes at least one LED module 12-1 to 12-4 (in this embodiment, four LED modules are illustrated). The voltage generation apparatus 2 is coupled to the LED light string 1, and the control module 3 is coupled to the voltage generation apparatus 2. The control module 3 controls the voltage generation apparatus 2 to generate a specific voltage according to a light command CL so that the DC voltage Vdc is affected by the specific voltage to change a signal Sc received at both ends of the LED light string 1. Each LED module 12-1 to 12-4 includes a controller 122 and at least one LED LED, and the controller 122 controls the lighting behavior of the LED LED according to the signal Sc.

Specifically, the light command CL usually includes a logic signal composed of "0" and "1", and is mainly a specific command in which "0" and "1" are arranged and combined in a specific order, for example, but not limited to "11010". By coding the logic signal, the specific LED modules 12-1 to 12-4 can be designated to generate a specific lighting behavior. For example, but not limited to "00" and "101" designate the lighting behavior of the LED module 12-1 (corresponding to "00") to flicker (corresponding to "101"). The controller 122 of the LED module 12-1 to 12-4 can realize the lighting behavior to be generated by itself according to a specific signal segment in the logic signal. That is, the logic signal includes at least one signal segment, and each LED module 12-1 to 12-4 correspondingly captures the signal segment to which it belongs so as to generate lighting behavior accordingly. The control module 3 changes the signal Sc at both ends of the LED light string 1 according to the light command CL so that the controller 122 of the LED module 12-1 to 12-4 realizes the lighting behavior that must be generated by yourself, and control the LED LED accordingly.

Furthermore, the light command CL includes a first logic H (for example, but not limited to "1") and a second logic L (for example, but not limited to "0"). Preferably, the light command CL may be composed of a plurality of first logics H, a plurality of second logics L or a combination of the two according to actual needs. In particular, the present disclosure takes the combination of the two as the main embodiment, but is not actually limited to this. The control module 3 controls the voltage generation apparatus 2 to generate a first specific voltage according to the first logic H so as to change the signal Sc to a first voltage level VH (for example, but not limited to a high-level signal) corresponding to a voltage difference between the DC voltage Vdc and the first specific voltage. The control module 3 controls the voltage generation apparatus 2 to generate a second specific voltage according to the second logic L so as to change the signal Sc to a second voltage level VL (for example, but not limited to a low-level signal) corresponding to a voltage difference between the DC voltage Vdc and the second specific voltage. In an embodiment of the present disclosure, the above-mentioned logics, signals and their corresponding relationships are merely examples, and are not limited thereto.

Since the LED light string control system 100 determines the logic signal of "0" or "1" according to the signal level, instead of only determining the logic signal according to the time width, if there are consecutive first logics H or consecutive second logics L, it must be distinguished to prevent the consecutive logics from being determined as a single logic. Therefore, the control module 3 controls the voltage generation apparatus 2 to change the signal Sc to a third voltage level as a distinction voltage VI to distinguish the two consecutive first voltage levels VH once the first logics H of the light command CL appear consecutively. Similarly, the control module 3 controls the voltage generation apparatus 2 to change the signal Sc to the third voltage level as the distinction voltage VI to distinguish the two consecutive second voltage levels VL once the second logics L of the light command CL appear consecutively. The control module 3 may directly control the voltage generation apparatus 2 to change the signal Sc to the corresponding distinction voltage VI when two consecutive identical logics are detected. It is also possible to generate distinction logic for distinguishing between two identical logics after detecting two consecutive identical logics, and then control the voltage generation apparatus 2 to change the signal Sc to the distinction voltage VI, which is different from the first voltage level VH and the second voltage level VL. Therefore, the controller 122 of the LED modules 12-1 to 12-4 may correspondingly generate the drive command CD according to the plurality of first voltage levels VH and second voltage levels VL (the distinction voltage VI is only used for distinction) to control the LED LED to generate lighting behavior according to the drive command CD. In one embodiment, the LED modules 12-1 to 12-4 are coupled in series, but they may also be coupled in parallel (not shown).

The main purpose and effect of the present disclosure are: since the LED light string control system 100 determines the logic signal of "0" or "1" according to the signal level, instead of only determining the logic signal according to the time width, it is not necessary to wait for the full/complete time width of a specific logic before determining that the logic of "0" or "1", and it will not cause the logic to be unidentifiable due to waveform distortion, which can significantly reduce the transmission time and determination time of the light command CL.

Figure 2:
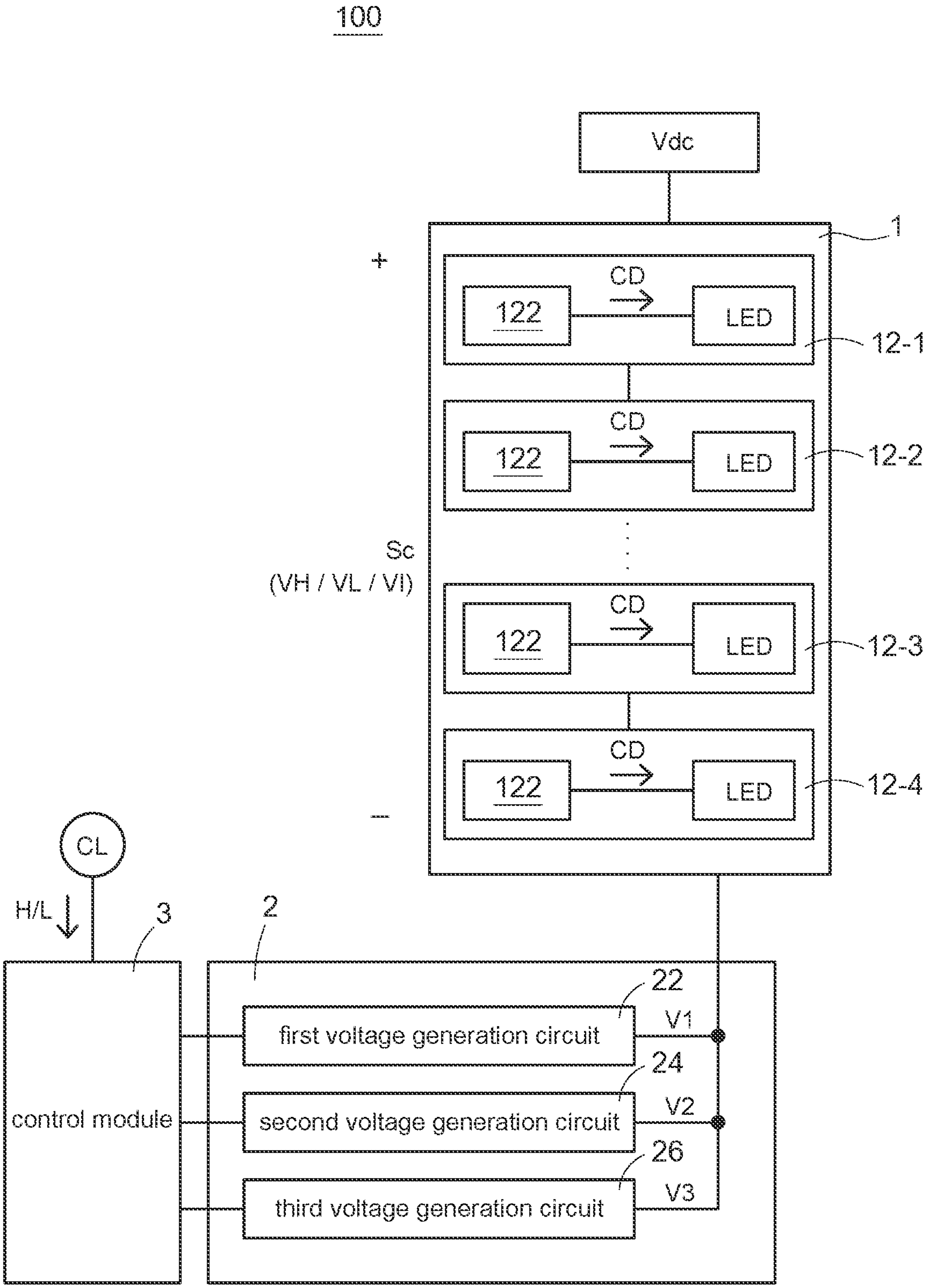
FIG. 2 is a block circuit diagram of a voltage generation apparatus according to the present disclosure.

Please refer to FIG. 2, which shows a block circuit diagram of a voltage generation apparatus according to the present disclosure, and also refer to FIG. 1. The voltage generation apparatus 2 includes a first voltage generation circuit 22 and a second voltage generation circuit 24. The first voltage generation circuit 22 and the second voltage generation circuit 24 are coupled to the LED light string 1 and the control module 3. When the light command CL is the first logic H, the control module 3 controls the first voltage generation circuit 22 to generate a first voltage V1 according to the first logic H so as to change the signal Sc to the first voltage level VH. When the light command CL is the second logic L, the control module 3 controls the second voltage generation circuit 24 to generate a second voltage V2 according to the second logic L so as to change the signal Sc to the second voltage level VL.

A third voltage generation circuit 26 is used to generate a third voltage V3 due to the distinction of two identical voltage levels so that the signal Sc is changed to the distinction voltage VI, which is different from the first voltage level VH and the second voltage level VL through the third voltage V3. Specifically, the third voltage generation circuit 26 is coupled to the LED light string 1 and the control module 3. The control module 3 controls the third voltage generation circuit 26 to generate the third voltage V3 so as to change the across voltage (voltage difference) to the distinction voltage VI.

In one embodiment, the control module 3 may include a controller, which may be a controller composed of components such as circuits (such as operational amplifiers, resistors, capacitors, etc.), logic gates, or a programmable microcontroller. The control module 3 may also include a detection unit (not shown) for detecting the voltage/current of each point at the LED light string control system 100 so as to stabilize the overall system by manners of detection and feedback.

Figure 3A:
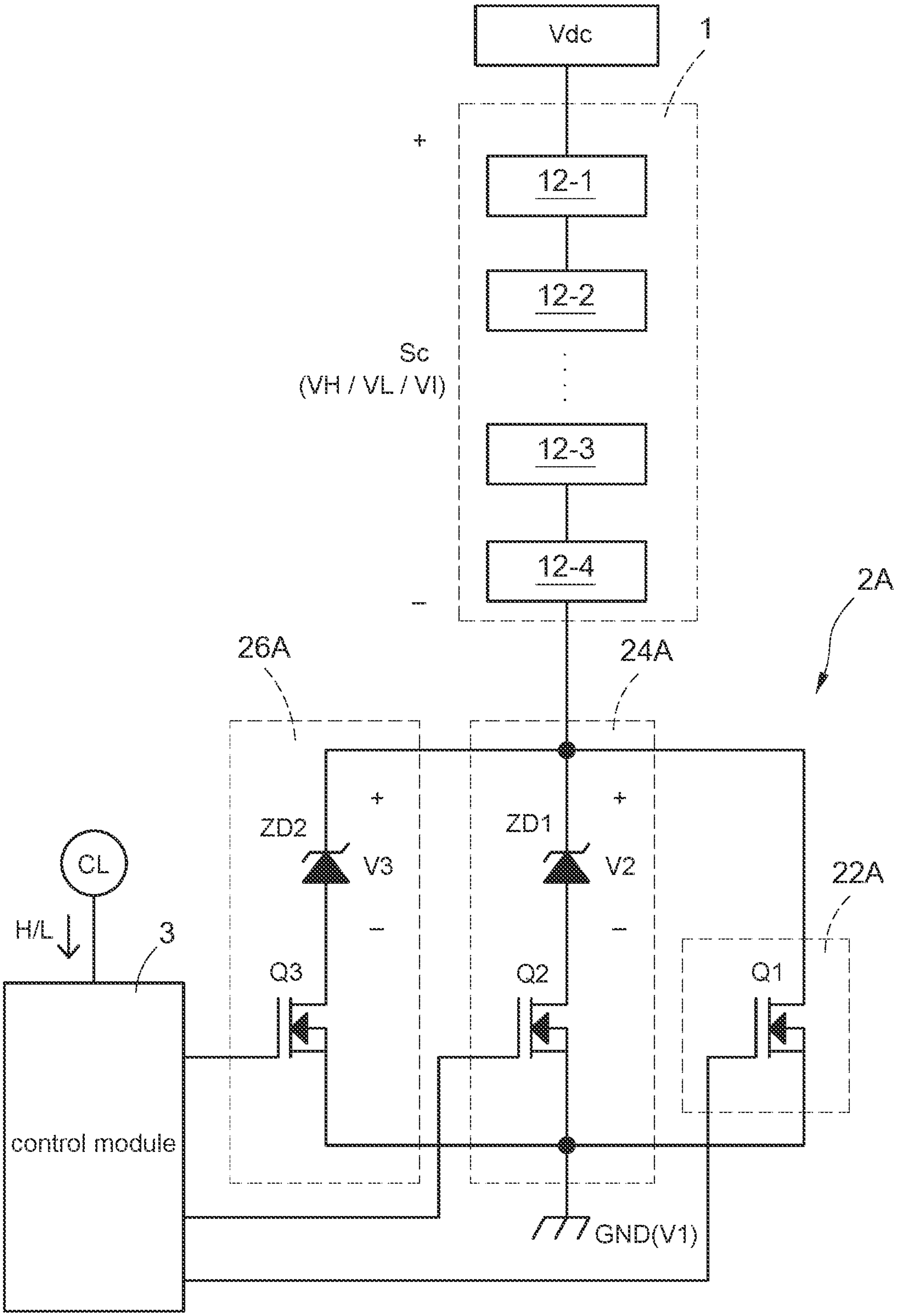
FIG. 3A is a detailed block circuit diagram of the LED light string control system according to a first embodiment of the present disclosure.
Figure 3B:
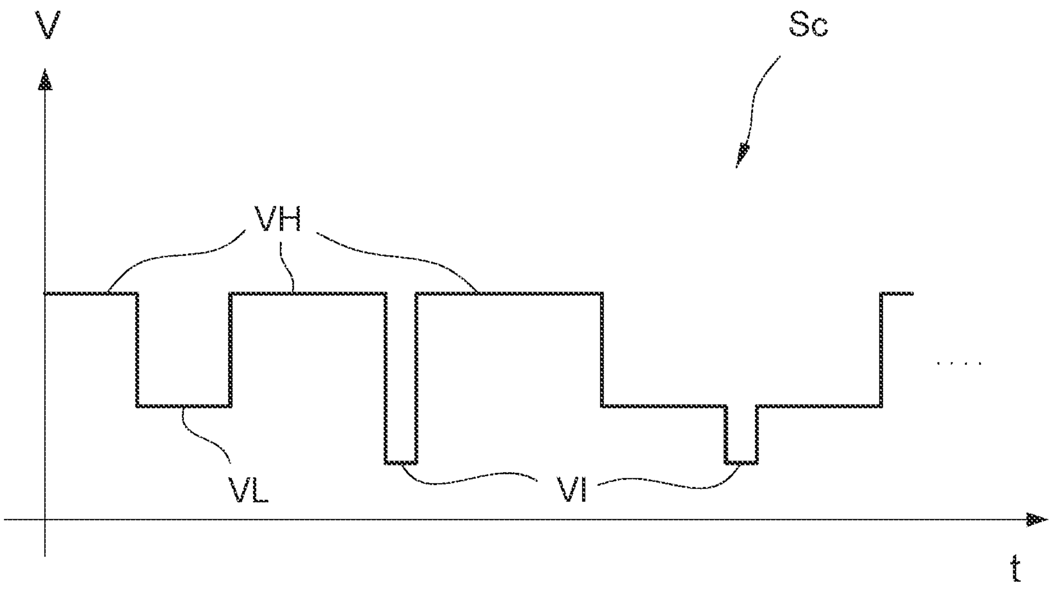
FIG. 3B is a schematic waveform of a signal of the LED light string control system shown in FIG. 3A.

Please refer to FIG. 3A, which shows a detailed block circuit diagram of the LED light string control system according to a first embodiment of the present disclosure, and refer to FIG. 3B, which shows a schematic waveform of a signal of the LED light string control system shown in FIG. 3A, and also refer to FIG. 1 and FIG. 2. In the voltage generation apparatus 2A, the first voltage generation circuit 22A includes a first switch Q1. The first switch is coupled to the LED light string 1 and a ground point GND, and a control end of the first switch Q1 is coupled to the control module 3. When the light command CL is the first logic H, the control module 3 turns on the first switch Q1 to make one end of the LED light string 1 be grounded. In this condition, one end of the LED light string 1 is grounded and the other end thereof receives the DC voltage Vdc, and therefore a voltage level of the ground point GND, for example, but not limited to zero volt is the first voltage V1, and the signal Sc (i.e., the first voltage level VH) of the LED light string 1 is the DC voltage Vdc (refer to FIG. 3B). On the contrary, when the light command CL is not the first logic H, the control module 3 turns off the first switch Q1 to disconnect a path of the first voltage generation circuit 22A.

The second voltage generation circuit 24A is connected to the first voltage generation circuit 22A in parallel. The second voltage generation circuit 24A includes a first regulation component ZD1 and a second switch Q2. The first regulation component ZD1 is coupled to the LED light string 1. The second switch Q2 is coupled to the first regulation component ZD1 and the ground point GND, and a control end of the second switch Q2 is coupled to the control module 3. When the light command CL is the second logic L, the control module 3 turns on the second switch Q2 so that the first regulation component ZD1 generates the second voltage V2 due to the turned-on second switch Q2. In this condition, one end of the LED light string 1 receives the second voltage V2, and the other end thereof receives the DC voltage Vdc, and therefore the signal Sc (i.e., the second voltage level VL) is changed to the DC voltage Vdc minus the second voltage V2 (refer to FIG. 3B). For example, when the second switch Q2 is turned on, the first regulation component ZD1 generates the second voltage V2 of 30 volts, the second voltage level VL is the DC voltage Vdc (assuming 100 volts) minus 30 volts. On the contrary, when the light command CL is not the second logic L, the control module 3 turns off the second switch Q2 so that a path of the second voltage generation circuit 24A is disconnected. In particular, the first regulation component ZD1 may be, for example, but not limited to, a Zener diode, or any component and any circuit that may be used for voltage regulation should be included in the scope of the present disclosure.

The third voltage generation circuit 26A is connected to the first voltage generation circuit 22A in parallel. The third voltage generation circuit 26A includes a second regulation component ZD2 and a third switch Q3. It is similar to the second voltage generation circuit 24A, when the light command CL is two identical logics, the control module 3 turns on the third switch Q3 between the two identical logics so that the second regulation component ZD2 generates the third voltage V3. Therefore, the signal Sc (i.e., the distinction voltage VI) is changed to the DC voltage Vdc minus the third voltage V3 (refer to FIG. 3B). For example, but not limited to, when the third switch Q3 is turned on, the second regulation component ZD2 generates the third voltage V3 of 50 volts, and the distinction voltage VI is equal to the DC voltage Vdc (assuming 100 volts) minus 50 volts. On the contrary, when the light command CL is not two identical logics, the control module 3 turns off the third switch Q3 so that a path of the third voltage generation circuit 26A is disconnected. In particular, the second regulation component ZD2 may be, for example, but not limited to, a Zener diode, or any component and any circuit that may be used for voltage regulation should be included in the scope of the present disclosure.

Figure 4A:
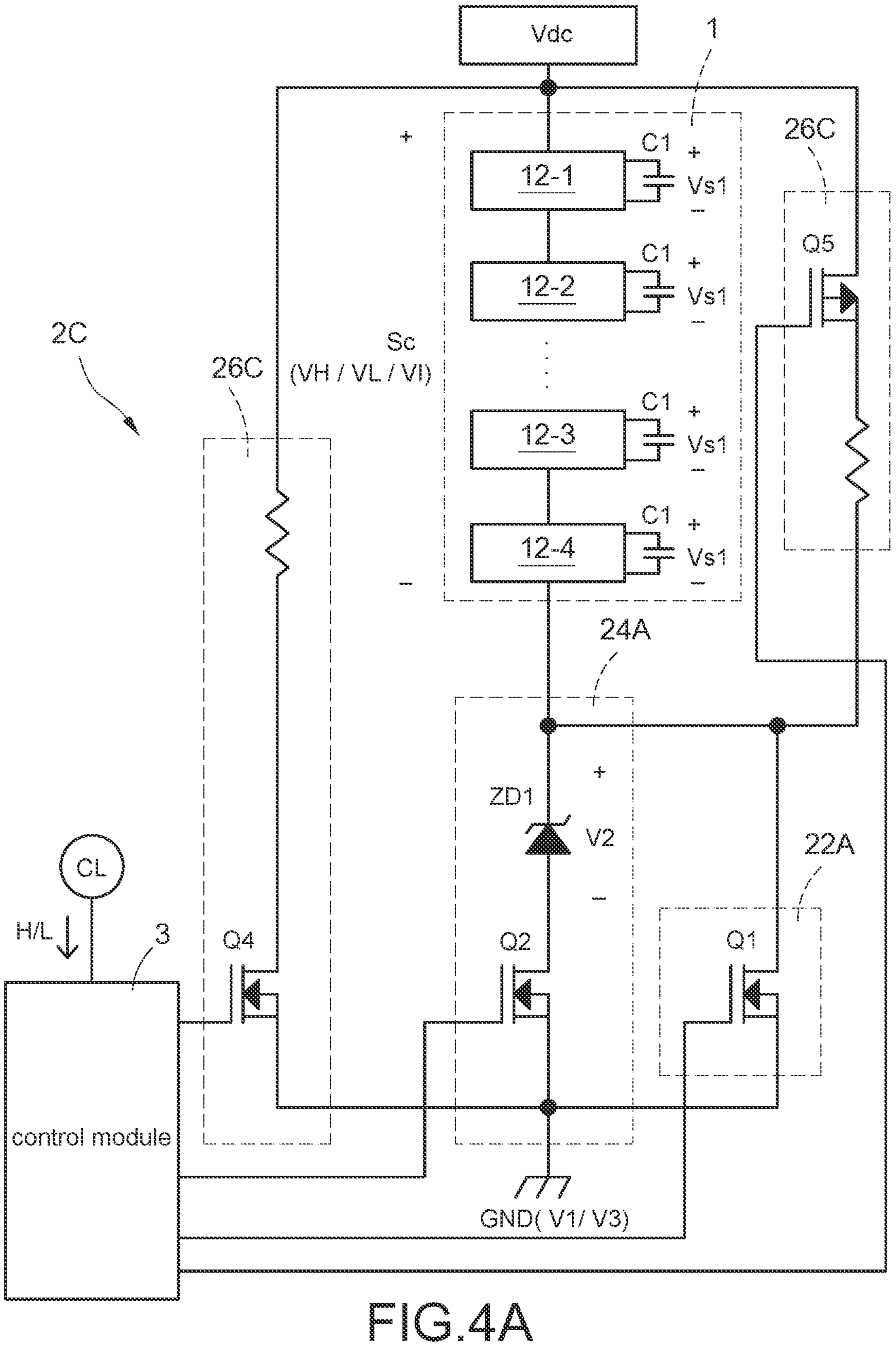
FIG. 4A is a detailed block circuit diagram of the LED light string control system according to a second embodiment of the present disclosure.
Figure 4B:
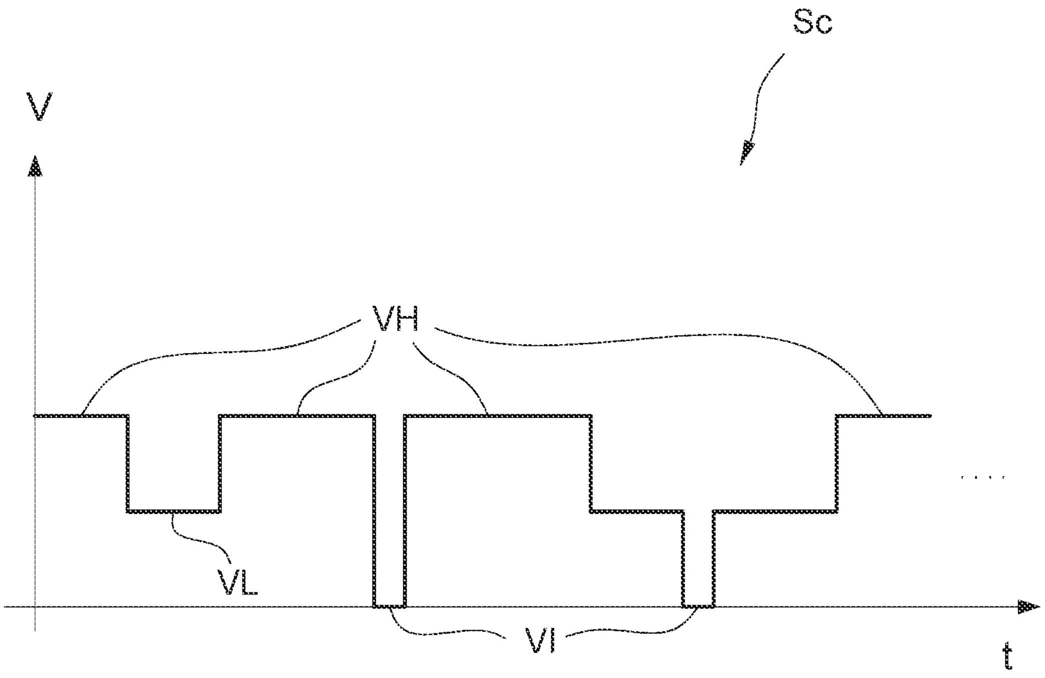
FIG. 4B is a schematic waveform of a signal of the LED light string control system shown in FIG. 4A.

Please refer to FIG. 4A, which shows a detailed block circuit diagram of the LED light string control system according to a second embodiment of the present disclosure, and refer to FIG. 4B, which shows a schematic waveform of a signal of the LED light string control system shown in FIG. 4A, and also refer to FIG. 1 and FIG. 3B. The difference between the voltage generation apparatus 2C shown in FIG. 4A and the voltage generation apparatus 2A shown in FIG. 3A is that the third voltage generation circuit 26C includes a fourth switch Q4 and a fifth switch Q5. The fourth switch Q4 is coupled to the LED light string 1 and the ground point GND, and a control end of the fourth switch Q4 is coupled to the control module 3. Therefore, when the fourth switch Q4 is turned on, a ground voltage (usually zero volt) of the ground point GND is used as the third voltage V3. The fifth switch Q5 is coupled to the LED light string 1 in parallel, and a control end of the fifth switch Q5 is coupled to the control module 3. When the light command CL is two identical logics, the control module 3 turns on the fourth switch Q4 and the fifth switch Q5 between the two identical logics so that a voltage at two ends of the LED light string 1 is fixed at the third voltage V3. Therefore, the signal Sc is changed to the third voltage V3 as the distinction voltage VI (refer to FIG. 5B). On the contrary, when the light command CL is not two identical logics, the control module 3 turns off the fourth switch Q4 and the fifth switch Q5 so that a path of the third voltage generation circuit 26C is disconnected. In one embodiment, the components, the coupling relationship between the components, and the operation manners not described in FIG. 5A and FIG. 5B are all the same as those in FIG. 3A and FIG. 3B, and the detailed description is omitted here for conciseness.

Since the distinction voltage VI is zero volt, if the LED light string 1 does not have the power-off memory function, the too-low voltage (such as but not limited to 30 volts or less) will trigger a reset function so that the data (such as the drive command CD) stored in the LED modules 12-1 to 12-4 are deleted due to reset. In order to prevent the LED light string 1 from being reset due to the distinction voltage VI, each LED module 12-1 to 12-4 needs to use a first capacitor C1. The first capacitor C1 is connected to the LED modules 12-1 to 12-4 in parallel to provide a first energy storage voltage Vs1 to regulate the LED modules 12-1 to 12-4 so as to prevent the LED modules 12-1 to 12-4 from being reset when the voltage is too low.

Figure 5A:
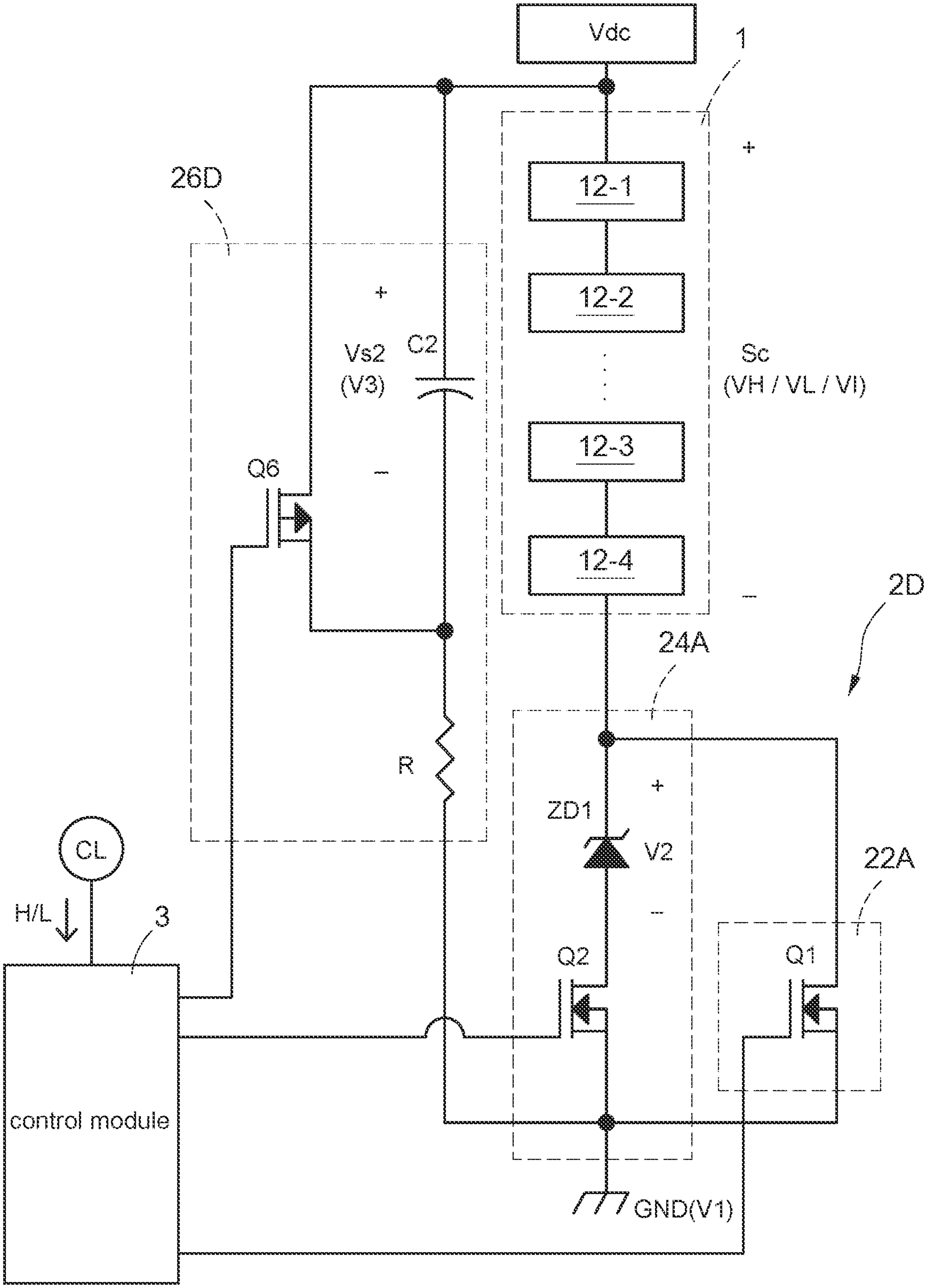
FIG. 5A is a detailed block circuit diagram of the LED light string control system according to a third embodiment of the present disclosure.
Figure 5B:
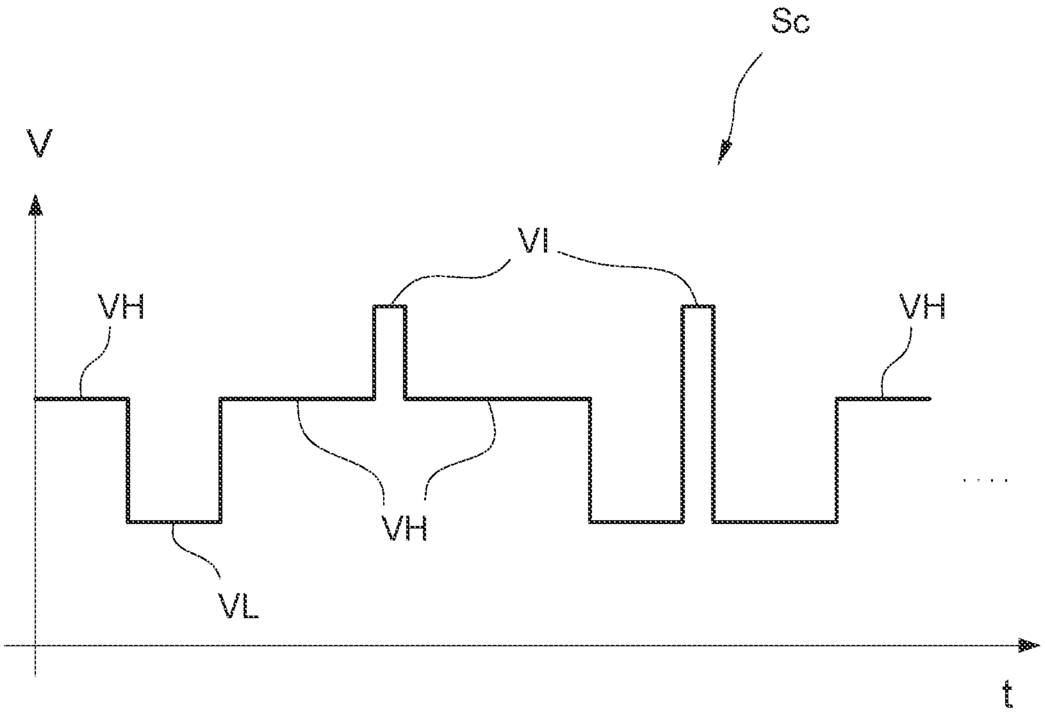
FIG. 5B is a schematic waveform of a signal of the LED light string control system shown in FIG. 5A.

Please refer to FIG. 5A, which shows a detailed block circuit diagram of the LED light string control system according to a third embodiment of the present disclosure, and refer to FIG. 5B, which shows a schematic waveform of a signal of the LED light string control system shown in FIG. 5A, and also refer to FIG. 1 to FIG. 4B. The difference between the voltage generation apparatus 2D shown in FIG. 5A and the voltage generation apparatus 2A shown in FIG. 3A is that the third voltage generation circuit 26D includes a second capacitor C2, a sixth switch Q6, and a resistor R. The second capacitor C2 is coupled to the LED light string 1. The sixth switch Q6 is coupled to the second capacitor C2 in parallel, and a control end of the sixth switch Q6 is coupled to the control module 3. A first end of the resistor R is coupled to the second capacitor C2 and the sixth switch Q6, and a second end of the resistor R is coupled to the ground point GND. When the control module 3 turns off the sixth switch Q6, the DC voltage Vdc charges the second capacitor C2 through a path provided by the second capacitor C2, the resistor R, and the ground point GND so that a second energy storage voltage Vs2 is stored in the second capacitor C2. When the light command CL is two identical logics, the control module 3 turns on the sixth switch Q6 between the two identical logics so that the second energy storage voltage Vs2 is used as the third voltage V3 to one end (of receiving the DC voltage Vdc) of the LED light string 1. Therefore, a voltage at one end of the LED light string 1 is equal to the DC voltage Vdc plus the second energy storage voltage Vs2 so that the signal Sc is changed to the distinction voltage VI that is equal to the DC voltage Vdc plus the distinction voltage VI (refer to FIG. 6B). On the contrary, when the light command CL is not two identical logics, the control module 3 turns off the sixth switch Q6 so that the second energy storage voltage Vs2 is not provided to one end of the LED light string 1. In one embodiment, the components, the coupling relationship between the components, and the operation manners not described in FIG. 5A and FIG. 5B are all the same as those in FIG. 3A and FIG. 3B, and the detailed description is omitted here for conciseness.

Figure 6:
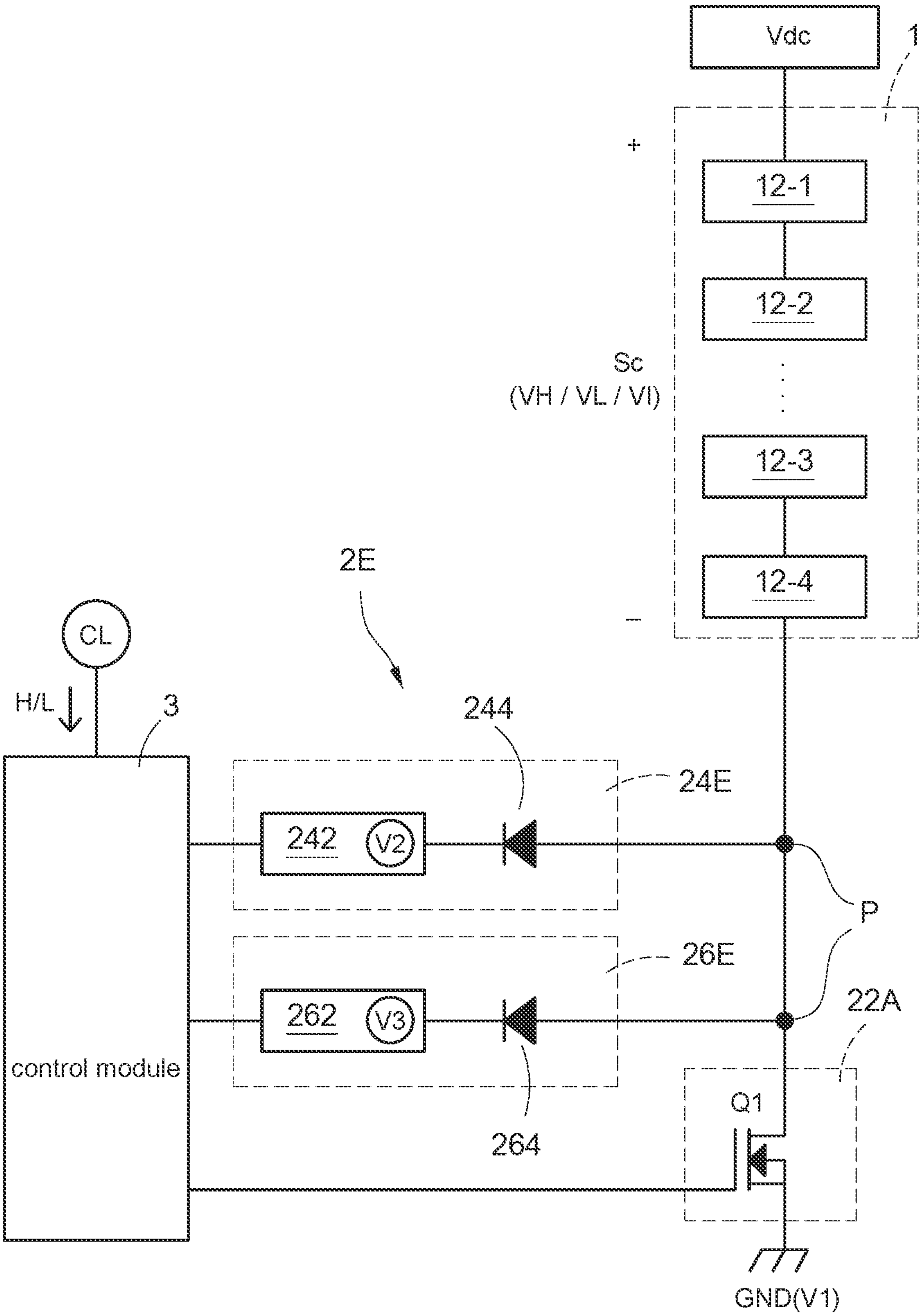
FIG. 6 is a detailed block circuit diagram of the LED light string control system according to a fourth embodiment of the present disclosure.

Please refer to FIG. 6, which shows a detailed block circuit diagram of the LED light string control system according to a fourth embodiment of the present disclosure, and also refer to FIG. 1 to FIG. 5B. The difference between the voltage generation apparatus 2E shown in FIG. 6 and the voltage generation apparatus 2A shown in FIG. 3A is that the second voltage generation circuit 24E includes a first voltage generation module 242 and a first unidirectional conduction component 244, and the third voltage generation circuit 26E includes a second voltage generation module 262 and a second unidirectional conduction component 264. The first voltage generation module 242 is coupled to a node P between the LED light string 1 and a first switch Q1 of the first voltage generation circuit 22A, and the first unidirectional conduction component 244 is coupled between the node P and the first voltage generation module 242. The control module 3 is coupled to the first voltage generation module 242, and the first unidirectional conduction component 244 is used for unidirectional conduction (connection) of a path from the node P to the first voltage generation module 242. The coupling relationship of the third voltage generation circuit 26D is similar to that of the second voltage generation circuit 24E, and the detailed description is omitted here for conciseness. In one embodiment, the first voltage generation module 242 and the second voltage generation module 262 are, for example, but not limited to voltage generators. Any apparatus, circuit, component that can be used to generate a specific voltage source based on the control of the control module 3 should be included in the scope of the present disclosure.

The method of controlling the LED light string control system is similar to FIG. 3A. When the light command CL is the second logic L, the control module 3 controls the first voltage generation module 242 to generate the second voltage V2 according to the second logic L so that the signal Sc (i.e., the second voltage level VL) is changed to the DC voltage Vdc minus the second voltage V2. On the contrary, when the light command CL is not the second logic L, the first voltage generation module 242 does not work and does not generate the second voltage V2. When the light command CL is two identical logics, the control module 3 controls the second voltage generation module 262 to generate the third voltage V3 between the two identical logics so that the signal Sc (i.e., the distinction voltage VI) is changed to the DC voltage Vdc minus the third voltage V3. On the contrary, when the light command CL is not two identical logics, the second voltage generation module 262 does not work and does not generate the third voltage V3. In one embodiment, the components, the coupling relationship between the components, and the operation manners not described in FIG. 6 are all the same as those in FIG. 3A, and the detailed description is omitted here for conciseness. In one embodiment, the first unidirectional conduction component 244 and the second unidirectional conduction component 246 are, for example, but not limited to diodes. Any component that can be used for unidirectional conduction (such as but not limited to a thyristor, etc.) should be included in the scope of the present disclosure.

In one embodiment, the circuit structures of FIG. 3A to FIG. 6 may be applied alternately, for example, but not limited to, the second voltage generation circuit 24E of FIG. 6 may be used as the second voltage generation circuit 24A of FIG. 3A, or the third voltage generation circuit 26C of FIG. 4A may be used as the third voltage generation circuit 24E of FIG. 6 (the LED modules 12-1 to 12-4 need to use a first capacitor C1). In addition, the voltage generation modules 242, 262 of FIG. 6 may generate specific voltages by setting so that the waveforms shown in FIG. 3B, FIG. 4B, and FIG. 5B may be generated based on the set parameters. The detailed waveform generation methods can be referred to above, and the detailed description is omitted here for conciseness.

Figure 7:
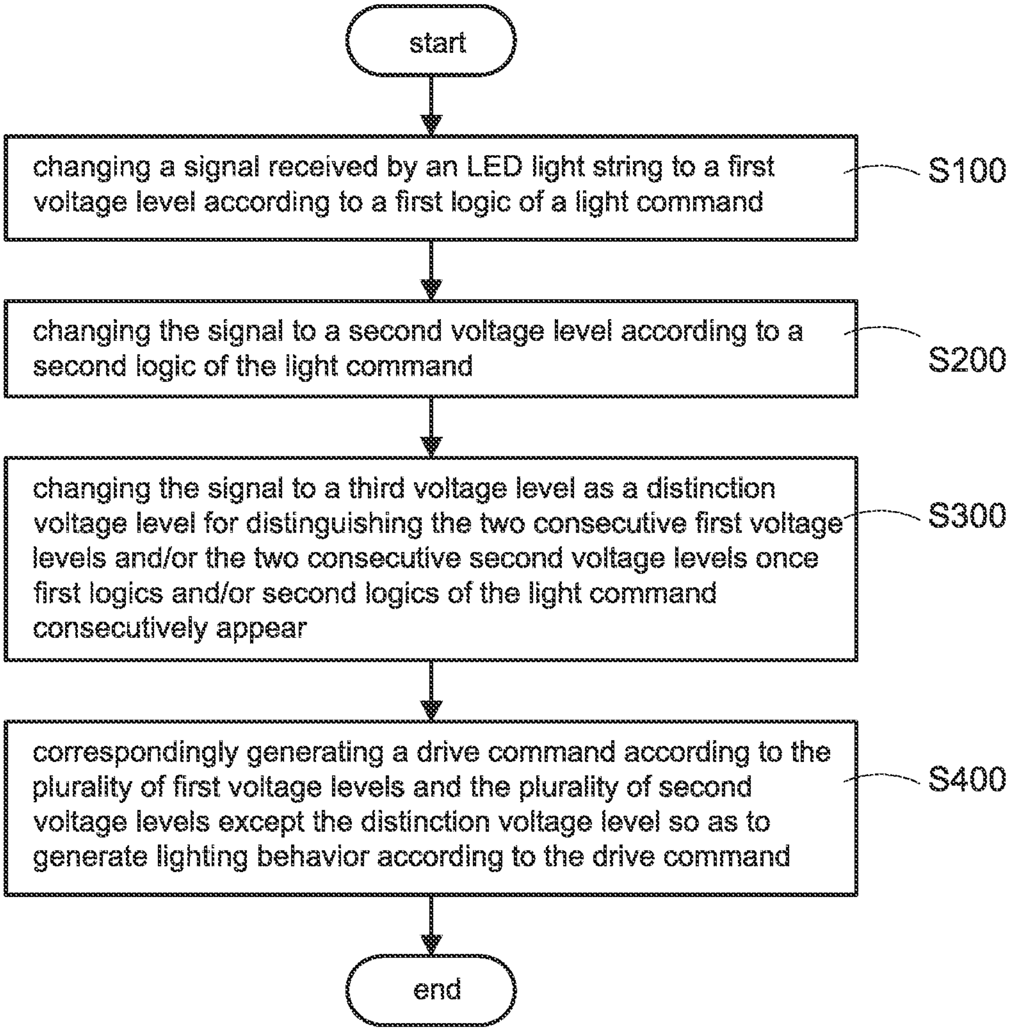
FIG. 7 is a flowchart of a method of controlling the LED light string control system according to the present disclosure.

Please refer to FIG. 7, which shows a flowchart of a method of controlling the LED light string control system according to the present disclosure, and also refer to FIG. 1 to FIG. 6. The method of controlling the LED light string control system 100 is mainly to determine the logic signal of "0" or "1" by the signal level, instead of the time width. The method includes steps of: changing a signal received by an LED light string to a first voltage level according to a first logic of a light command (S100). In one embodiment, a control module 3 controls a voltage generation apparatus 2 to generate a first specific voltage according to the first logic H so as to change the signal Sc to a first voltage level VH (for example, but not limited to a high-level signal) corresponding to a voltage difference between a DC voltage Vdc and the first specific voltage. Afterward, changing the signal to a second voltage level according to a second logic of the light command (S200). In one embodiment, the control module 3 controls the voltage generation apparatus 2 to generate a second specific voltage according to the second logic L so as to change the signal Sc to a second voltage level VL (for example, but not limited to a low-level signal) corresponding to a voltage difference between the DC voltage Vdc and the second specific voltage.

Afterward, changing the signal to a third voltage level as a distinction voltage level for distinguishing the two consecutive first voltage levels and/or the two consecutive second voltage levels when first logics and/or second logics of the light command appear consecutively (S300). The control module 3 preferably controls the third voltage generation circuit 26 shown in FIG. 2 to generate the third voltage V3 so that the signal Sc is changed to the distinction voltage VI, which is different from the first voltage level VH and the second voltage level VL through the third voltage V3. Finally, correspondingly generating a drive command, by at least one LED module of the LED light string, according to the plurality of first voltage levels and the plurality of second voltage levels except the distinction voltage level so as to generate lighting behavior according to the drive command (S400). Therefore, the controller 122 of the LED modules 12-1 to 12-4 may correspondingly generate the drive command CD according to the plurality of first voltage levels VH and second voltage levels VL (the distinction voltage VI is only used for distinction) to control the LED LED to generate lighting behavior according to the drive command CD. In one embodiment, the detailed operations of steps (S100) to (S300) depend on the internal circuit structure of the LED light string control system 100, which may be referred to FIG. 3A to FIG. 6, and the detailed description is omitted here for conciseness.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An LED light string control system, comprising:

an LED light string, comprising at least one LED module, a voltage generation apparatus, coupled to the LED light string, and a control module, coupled to the voltage generation apparatus, and configured to control the voltage generation apparatus to change a signal provided to the LED light string to a first voltage level according to a first logic of a light command, and to change the signal to a second voltage level according to a second logic of the light command, wherein the light command is composed of the plurality of first logics and the plurality of second logics; the control module controls the voltage generation apparatus to change the signal to a third voltage level as a distinction voltage level to distinguish between the two consecutive first voltage levels and/or the two consecutive second voltage levels once the first logics and/or the second logics of the light command appear consecutively; the at least one LED module correspondingly generates a drive command according to the plurality of first voltage levels and the plurality of second voltage levels except the distinction voltage level so as to generate lighting behavior according to the drive command.

2. The LED light string control system as claimed in claim 1, wherein the voltage generation apparatus comprises:

a first voltage generation circuit, coupled to the LED light string and the control module, a second voltage generation circuit, coupled to the LED light string and the control module, and a third voltage generation circuit, coupled to the LED light string and the control module, wherein the control module controls the first voltage generation circuit to generate a first voltage to change the signal to the first voltage level; the control module controls the second voltage generation circuit to generate a second voltage to change the signal to the second voltage level; the control module controls the third voltage generation circuit to generate a third voltage to change the signal to the distinction voltage level.

3. The LED light string control system as claimed in claim 2, wherein the first voltage generation circuit comprises:

a first switch, coupled to the LED light string and the control module, wherein the control module turns on the first switch to make a ground voltage as the first voltage so that a DC voltage received by the LED light string is used as the first voltage level.

4. The LED light string control system as claimed in claim 2, wherein the second voltage generation circuit comprises:

a first regulation component, coupled to the LED light string, and a second switch, coupled to the first regulation component and the control module, wherein the first regulation component generates the second voltage due to the turned-on second switch controlled by the control module so as to change the signal to the second voltage level that is equal to the DC voltage minus the second voltage.

5. The LED light string control system as claimed in claim 2, wherein the second voltage generation circuit comprises:

a first voltage generation module, coupled to a node between the LED light string and the first switch, and a first unidirectional conduction component, coupled to the node and the first voltage generation module, and configured for unidirectional conduction of a path from the node to the first voltage generation module, wherein the control module controls the first voltage generation module to generate the second voltage according to the second logic so as to change the signal to the second voltage level that is equal to the DC voltage minus the second voltage.

6. The LED light string control system as claimed in claim 2, wherein the third voltage generation circuit comprises:

a second regulation component, coupled to the LED light string, and a third switch, coupled to the second regulation component and the control module, wherein the second regulation component generates the third voltage due to the turned-on third switch controlled by the control module so as to change the signal to the distinction voltage level that is equal to a DC voltage received by the LED light string minus the third voltage.

7. The LED light string control system as claimed in claim 2, wherein the at least one LED module comprises:

a first capacitor, coupled to the at least one LED module in parallel, and configured to provide a first energy storage voltage to regulate the at least one LED module, wherein the third voltage generation circuit comprises:

a fourth switch, coupled to the LED light string and a ground point, and a voltage of the ground point to be the third voltage, and a fifth switch, coupled to the LED light string in parallel, wherein the control module turns on the fourth switch and the fifth switch according to a distinction logic so as to change the signal to the third voltage as the distinction voltage level.

8. The LED light string control system as claimed in claim 2, wherein the third voltage generation circuit comprises:

a second capacitor, coupled to the LED light string, a third switch, coupled to the second capacitor in parallel, and a resistor, coupled to the second capacitor, the sixth switch, and a ground point, wherein the second capacitor stores a second energy storage voltage when the sixth switch is turned off, and the control module turns on the sixth switch due to the distinction of two identical voltage levels so as to change the signal to the distinction voltage level that is equal to a DC voltage received by the LED light string plus the second energy storage voltage.

9. The LED light string control system as claimed in claim 2, wherein the third voltage generation circuit comprises:

a second voltage generation module, coupled to a node between the LED light string and the first switch, a second unidirectional conduction component, coupled to the node and the second voltage generation module, and configured for unidirectional conduction of a path from the node to the second voltage generation module, wherein the control module controls the second voltage generation module to generate the third voltage due to the distinction of two identical voltage levels so as to change the signal to the distinction voltage level that is equal to the DC voltage minus the third voltage.

10. A method of controlling an LED light string control system, the method comprising steps of:

changing a signal received by an LED light string to a first voltage level according to a first logic of a light command, changing the signal to a second voltage level according to a second logic of the light command, changing the signal to a third voltage level as a distinction voltage level for distinguishing between the two consecutive first voltage levels and/or the two consecutive second voltage levels when first logics and/or second logics of the light command appear consecutively, and correspondingly generating a drive command, by at least one LED module of the LED light string, according to the plurality of first voltage levels and the plurality of second voltage levels except the distinction voltage level so as to generate lighting behavior according to the drive command, wherein the light command is composed of the plurality of first logics and the plurality of second logics.

11. The method of controlling the LED light string control system as claimed in claim 10, further comprising steps of:

providing a first voltage to change the signal to the first voltage level, providing a second voltage to change the signal to the second voltage level, and providing a third voltage to change the signal to the distinction voltage level.

12. The method of controlling the LED light string control system as claimed in claim 11, further comprising a step of:

using a ground voltage as the first voltage to use a DC voltage received by the LED light string as the first voltage level.

13. The method of controlling the LED light string control system as claimed in claim 11, further comprising a step of:

changing the signal to the second voltage level that is equal to the DC voltage minus the second voltage.

14. The method of controlling the LED light string control system as claimed in claim 11, further comprising a step of:

changing the signal to the distinction voltage level that is equal to a DC voltage received by the LED light string minus the third voltage due to the distinction of two identical voltage levels.

15. The method of controlling the LED light string control system as claimed in claim 11, wherein the at least one LED module comprises a first capacitor used for regulation, and the method further comprises steps of:

using a ground voltage as the third voltage, and changing the signal to the third voltage as the distinction voltage level due to the distinction of two identical voltage levels.

16. The method of controlling the LED light string control system as claimed in claim 11, further comprising steps of:

pre-storing a second energy storage voltage, and changing the signal to the distinction voltage level that is equal to a DC voltage received by the LED light string plus the second energy storage voltage due to the distinction of two identical voltage levels.

* * * * *